United States Patent
Verma et al.

(10) Patent No.: US 10,963,460 B2
(45) Date of Patent: Mar. 30, 2021

(54) INTEGRATED CIRCUITS AND METHODS TO ACCELERATE DATA QUERIES

(71) Applicant: Xilinx, Inc., San Jose, CA (US)

(72) Inventors: Hare K. Verma, San Jose, CA (US); Bing Tian, San Jose, CA (US)

(73) Assignee: XILINX, INC., San Jose, CA (US)

( * ) Notice: Subject to any disclaimer, the term of this patent is extended or adjusted under 35 U.S.C. 154(b) by 210 days.

(21) Appl. No.: 16/212,134

(22) Filed: Dec. 6, 2018

(65) Prior Publication Data

US 2020/0183937 A1    Jun. 11, 2020

(51) Int. Cl.
| | |
|---|---|
| G06F 16/00 | (2019.01) |
| G06F 16/2453 | (2019.01) |
| G06F 16/2455 | (2019.01) |
| G06F 9/30 | (2018.01) |

(52) U.S. Cl.
CPC .... *G06F 16/24549* (2019.01); *G06F 9/30101* (2013.01); *G06F 16/24568* (2019.01)

(58) Field of Classification Search
CPC ......... G06F 16/24569; G06F 16/24549; G06F 9/30101
See application file for complete search history.

(56) References Cited

U.S. PATENT DOCUMENTS

| | | |
|---|---|---|
| 5,488,729 A | 1/1996 | Vegesna et al. |
| 6,223,208 B1 | 4/2001 | Kiefer et al. |
| 6,411,951 B1 | 6/2002 | Galindo-Legaria et al. |
| 7,580,971 B1 | 8/2009 | Gollapudi et al. |
| 8,260,803 B2 | 9/2012 | Hsu et al. |
| 10,255,320 B1 * | 4/2019 | Cappiello ............. G06F 16/245 |
| 2004/0114609 A1 | 6/2004 | Swarbrick et al. |
| 2004/0210695 A1 | 10/2004 | Weber et al. |
| 2008/0320255 A1 | 12/2008 | Wingard et al. |
| 2008/0320268 A1 | 12/2008 | Wingard et al. |
| 2012/0036296 A1 | 2/2012 | Wingard et al. |
| 2014/0379113 A1 * | 12/2014 | Yamamoto ....... G05B 19/41865 700/110 |

FOREIGN PATENT DOCUMENTS

| | | |
|---|---|---|
| CN | 101021874 A | 8/2007 |
| CN | 102567944 A | 7/2012 |

OTHER PUBLICATIONS

Divya Mahajan et al: In-RDBMS Hardware Acceleration of Advanced Analytics, arxiv.org, Cornell University Library, 201 Olin Library Cornell University Ithaca, NY 14853, Jan. 8, 2018, XP081509626, DOI: 10.14778/3236187.3236188.

* cited by examiner

*Primary Examiner* — Cheryl Lewis
(74) *Attorney, Agent, or Firm* — Patterson + Sheridan, LLP (57) ABSTRACT

Integrated circuits and methods relating to hardware acceleration include independent, programmable, and parallel processing units (PU) custom-adapted to process a data stream and aggregate the results to respond to a query. In an illustrative example, a data stream from a database may be divided into data blocks and allocated to a corresponding PU. Each data block may be processed by one of the PUs to generate results according to a predetermined instruction set. A concatenate unit may merge and concatenate a result of each data block together to generate an output result for the query. In some embodiments, very large database SQL queries, for example, may be accelerated by hardware PU/concatenate engines implemented in fixed ASIC or reconfigurable FPGA hardware circuitry.

20 Claims, 7 Drawing Sheets

| INSTRUCTION | LEFT & RIGHT OPERANDS | RESULTS | REMARKS |
|---|---|---|---|
| AND, OR | 64 bit reg | 1-bit bool | FILTER OPERATIONS |
| NOT, GT, GE, LT, LE, EQ, NEQ | 64 bit reg | 1-bit bool | FILTER OPERATIONS |
| PLUS, SUB | 64 bit reg | 64 bit reg | ADD/SUBTRACT |
| MULT | 64 bit reg | 64 bit reg | MULTIPLY |

INTEGRATED CIRCUITS AND METHODS TO ACCELERATE DATA QUERIES

TECHNICAL FIELD

Various embodiments relate generally to integrated circuits that have configurable fabrics used for hardware acceleration.

BACKGROUND

Big data is used to refer to the study and applications of data sets that are so big and complex that traditional data-processing application software is inadequate to deal with them. Big data brings challenges, and those challenges include, but are not limited to, data capturing, data storage, data analysis, data updating, information privacy, and data querying.

A data query may generally refer to a request for data or information from a database table or combination of tables. This data may be generated as results returned by Structured Query Language (SQL) or as pictorials, graphs, or complex results (e.g., trend analyses from data-mining tools). SQL is a standard language for storing, manipulating and retrieving data in databases.

SUMMARY

Integrated circuits and methods relating to hardware acceleration include independent, programmable, and parallel processing units (PU) custom-adapted to process a data stream and aggregate the results to respond to a query. In an illustrative example, a data stream from a database may be divided into data blocks and allocated to a corresponding PU. Each data block may be processed by one of the PUs to generate results according to a predetermined instruction set. A concatenate unit may merge and concatenate a result of each data block together to generate an output result for the query. In some embodiments, very large database SQL queries, for example, may be accelerated by hardware PU/concatenate engines implemented in fixed ASIC or reconfigurable FPGA hardware circuitry.

In some embodiments, a field programmable gate array (FPGA) may provide electrically reconfigurable, programmable hardware logic circuits formed in a fabric. The FPGA fabric may be reconfigurable, in response to electrical configuration signals, to provide a query-specific arrangement of hardware resources. As taught herein, the reconfigured fabric may be arranged to produce a hardware accelerator for efficiently processing a query of a large database by customizing the hardware processing circuitry uniquely for each query so that a single FPGA can flexibly accelerate a wide range of queries.

In some embodiments, an application specific integrated circuit (ASIC) may be manufactured to provide a fixed arrangement of hardware logic circuits (e.g., digital, analog). The ASIC may provide a hardware accelerator for efficiently processing a query of a large database with customized hardware processing circuitry for one or more predetermined queries so that one or more ASICs, alone or in combination, can accelerate one or more predetermined queries.

Various embodiments may achieve one or more advantages. For example, some embodiments may substantially reduce data query response time and/or increase processing throughput when performing, for example, queries on large-scale databases. Hardware acceleration of database queries may be implemented with customizable (e.g., non-fixed) hardware blocks configured according to the operations and parameters for each specific query. Some implementations may be programmed in a programmable fabric device to perform a customer supplied query of a large database. Various embodiments may offload high speed data stream processing from a fixed central processing unit (CPU) to a custom programmed hardware processing channel in which multiple data blocks of the data stream can be individually processed according to a predetermined instruction set. As such, substantial computational efficiency may be achieved, which may result in dramatically reduced processing time for a query of a large scale database.

For example, some embodiments may reduce the fabrication cost and decrease decentralized non-synchronized communication, for example, by leveraging reconfigurable fabric devices (e.g., FPGA) to perform highly efficient parallel processing with minimal hardware resources. For example, some embodiments may improve the kernel level performance, and/or provide a 10-25 times performance improvement, for example, over CPUs when processing some queries. In various implementations, an FPGA with field programmable capabilities, be flexibly customized by an end user one or more times to meet dynamic query requirements.

In some embodiments, an ASIC may advantageously provide hardware acceleration capabilities for one or more predetermined query structures using dedicated (e.g., fixed) hardware circuits. Some embodiments that incorporate ASICs may provide query hardware acceleration with reduced component cost, volume, and/or power requirements, for example.

In one exemplary aspect, an integrated circuit includes a plurality of processing units (PU(i)). The PU(i)s are arranged in parallel. Each of the PU(i) is formed of hardware circuits configured to process selected data blocks of a data stream according to a predetermined instruction set (S(i)) in an instruction set group (G) that uses a predetermined query language. Each PU(i) generates an intermediate output result corresponding to the selected portion of the data stream processed by the PU(i). A concatenate circuit is coupled to receive each of the intermediate output results from each of the plurality of PU(i) and to generate an aggregated result. Each of the S(i) includes a function of an instruction extracted from a user defined query.

In some embodiments, the predetermined instruction set (S(i)) may include SQL instructions. In some embodiments, the predetermined query language may include SQL. In some embodiments, the concatenate unit may be configured to generate the aggregated result according to a predetermined function associated with the user defined query. In some embodiments, each of the plurality of processing units may be implemented as a fixed hardware circuit in an ASIC. In some embodiments, each of the plurality of processing units may be implemented as reconfigurable hardware in a programmable fabric of an FPGA.

In some embodiments, the integrated circuit may also include a scheduler circuit coupled to receive the data stream. The scheduler circuit may be configured to selectively direct each one of the data blocks to one of the plurality of the PU(i). In some embodiments, the scheduler circuit may include a round-robin scheduler. In some embodiments, each of the S(i) may also include a function of at least one parameter extracted from the user defined query. In some embodiments, each of the plurality of PU(i) may include an arithmetic logic unit ALU adapted to execute the corresponding S(i) by performing an operation based on an extracted instruction. The operation may be performed using (i) a first operand comprising a portion of the data stream stored in a variable register, and (ii) a second operand comprising one of the extracted parameters stored in a constant register.

In some embodiments, each of the plurality of processing units may also include a temporary register configured to hold a result of the performed operations, a first multiplexer configured to receive inputs from the constant register and the variable register, and a second multiplexer configured to receive inputs from the constant register, the variable register and the temporary register.

In some embodiments, each of the plurality of PU(i) may also include an instruction register configured to store the S(i) to be performed in the ALU. In some embodiments, each of the PU(i) may be configured with the same S(i). In some embodiments, each of the PU(i) may be configured with a different S(i). The plurality of instructions in the predetermined query language instruction set group G may include scan instructions and aggregation instructions. The scan instructions may include an AND logic operation and an OR logic operation.

In another exemplary aspect, a method to configure a fabric to perform a data query includes receiving a data query from a user and converting the data query into a predetermined query language command. The method also includes extracting parameters to be stored in a plurality of parallel processing units PU(i) from the command and extracting instructions from the command to form an instruction set group G to be performed by the PU(i). The instruction set group G includes a plurality of instruction sets S(i). The method also includes loading the plurality of PU(i) with the extracted parameters and the extracted instructions. Each of the PU(i) is configured to process, in parallel, a predetermined data block(i) of a data stream with its corresponding parameters and instruction set S(i).

In some embodiments, the predetermined query language may include SQL. In some embodiments, each of the PU(i) may be configured with the same S(i). The method may also include clearing all the PU(i) before loading the extracted parameters and the extracted instructions.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, an exemplary programmable integrated circuit (IC) on which the disclosed hardware acceleration processing engine and processes may be implemented is briefly introduced with reference to FIG. 1. Second, with reference to FIGS. 2(A)-3, the discussion turns to exemplary embodiments that illustrate the structure of a configured fabric and method to configure a fabric. Then, with reference to FIGS. 4(A)-5, an exemplary structure of a processing unit and an exemplary structure of hardware acceleration processing engine is presented. Finally, with reference to FIG. 6, an exemplary method used to perform a data query at run-time is presented.

Figure 1:
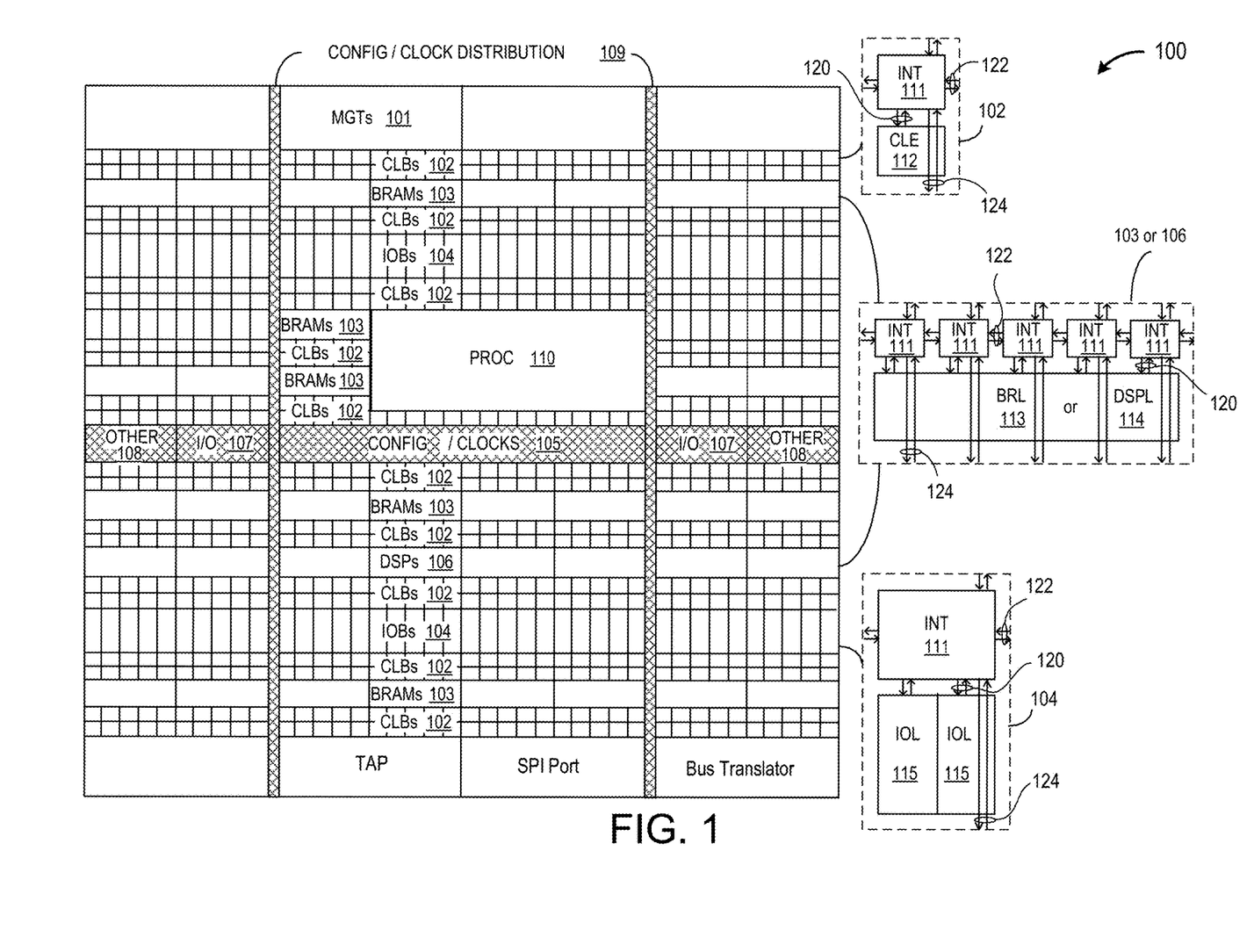
FIG. 1 depicts an exemplary programmable integrated circuit (IC) on which the disclosed circuits and processes may be implemented.
Figure 2:
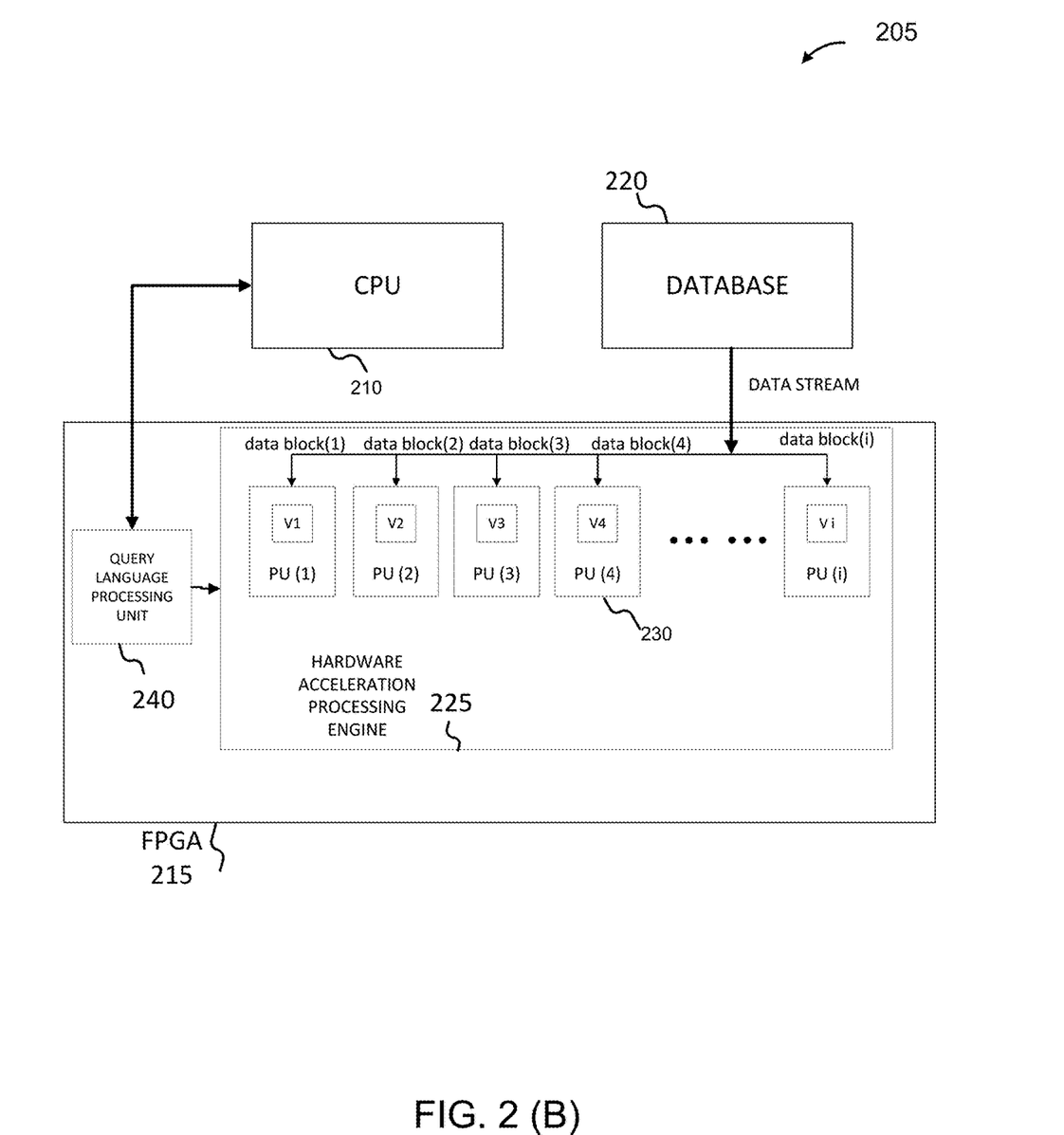
FIG. 2(A) depicts a host computing system with an exemplary hardware acceleration processing engine.
FIG. 2(B) depicts a block diagram of the hardware accelerated processing system of FIG. 2(A) performing an exemplary data query.

FIG. 1 depicts an exemplary programmable integrated circuit (IC) on which the disclosed circuits and processes may be implemented. A programmable IC 100 includes FPGA logic. The programmable IC 100 may be implemented with various programmable resources and may be referred to as a System on Chip (SOC). Various examples of FPGA logic may include several diverse types of programmable logic blocks in an array.

For example, FIG. 1 illustrates a programmable IC 100 that includes a large number of different programmable tiles including multi-gigabit transceivers (MGTs) 101, configurable logic blocks (CLBs) 102, blocks of random access memory (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., clock ports), and other programmable logic 108 (e.g., digital clock managers, analog-to-digital converters, system monitoring logic). The programmable IC 100 includes dedicated processor blocks (PROC) 110. The programmable IC 100 may include internal and external reconfiguration ports (not shown).

In various examples, a serializer/deserializer may be implemented using the MGTs 101. The MGTs 101 may include various data serializers and deserializers. Data serializers may include various multiplexer implementations. Data deserializers may include various demultiplexer implementations.

In some examples of FPGA logic, each programmable tile includes a programmable interconnect element (INT) 111 having standardized inter-connections 124 to and from a corresponding interconnect element in each adjacent tile. Therefore, the programmable interconnect elements taken together implement the programmable interconnect structure for the illustrated FPGA logic. The programmable interconnect element INT 111 includes the intra-connections 120 to and from the programmable logic element within the same tile, as shown by the examples included in FIG. 1. The programmable interconnect element INT 111 includes the inter-INT-connections 122 to and from the programmable interconnect element INT 111 within the same tile, as shown by the examples included in FIG. 1.

For example, a CLB 102 may include a configurable logic element (CLE) 112 that may be programmed to implement user logic, plus a single programmable interconnect element INT 111. A BRAM 103 may include a BRAM logic element (BRL) 113 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 106 may include a DSP logic element (DSPL) 114 and one or more programmable interconnect elements. An IOB 104 may include, for example, two instances of an input/output logic element (IOL) 115 and one instance of the programmable interconnect element INT 111. The actual I/O bond pads connected, for example, to the I/O logic element 115, may be manufactured using metal layered above the various illustrated logic blocks, and may not be confined to the area of the input/output logic element 115.

In the pictured implementation, a columnar area near the center of the die (shown shaded in FIG. 1) is used for configuration, clock, and other control logic. Horizontal areas 109 extending from the column distribute the clocks and configuration signals across the breadth of the programmable IC 100. Note that the references to "columnar" and "horizontal" areas are relative to viewing the drawing in a portrait orientation.

Some programmable ICs utilizing the architecture illustrated in FIG. 1 may include additional logic blocks that disrupt the regular columnar structure making up a large part of the programmable IC. The additional logic blocks may be programmable blocks and/or dedicated logic. For example, the processor block PROC 110 shown in FIG. 1 spans several columns of CLBs 102 and BRAMs 103.

FIG. 1 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 102 may be included wherever the CLBs 102 appear, to facilitate the efficient implementation of user logic.

With the continued expansion of computer applications in various fields, various application scenarios have placed increasing demands on data processing capabilities of servers. It may be very difficult for servers to balance the allocation of resources in some specific scenarios. To achieve a required processing speed, more powerful computing power is needed. In some situations where data processing speed is critical, an FPGA could be used to share some of the central processing unit (CPU) work by a hardware accelerator and undertake certain types of calculations.

Figure 2A:
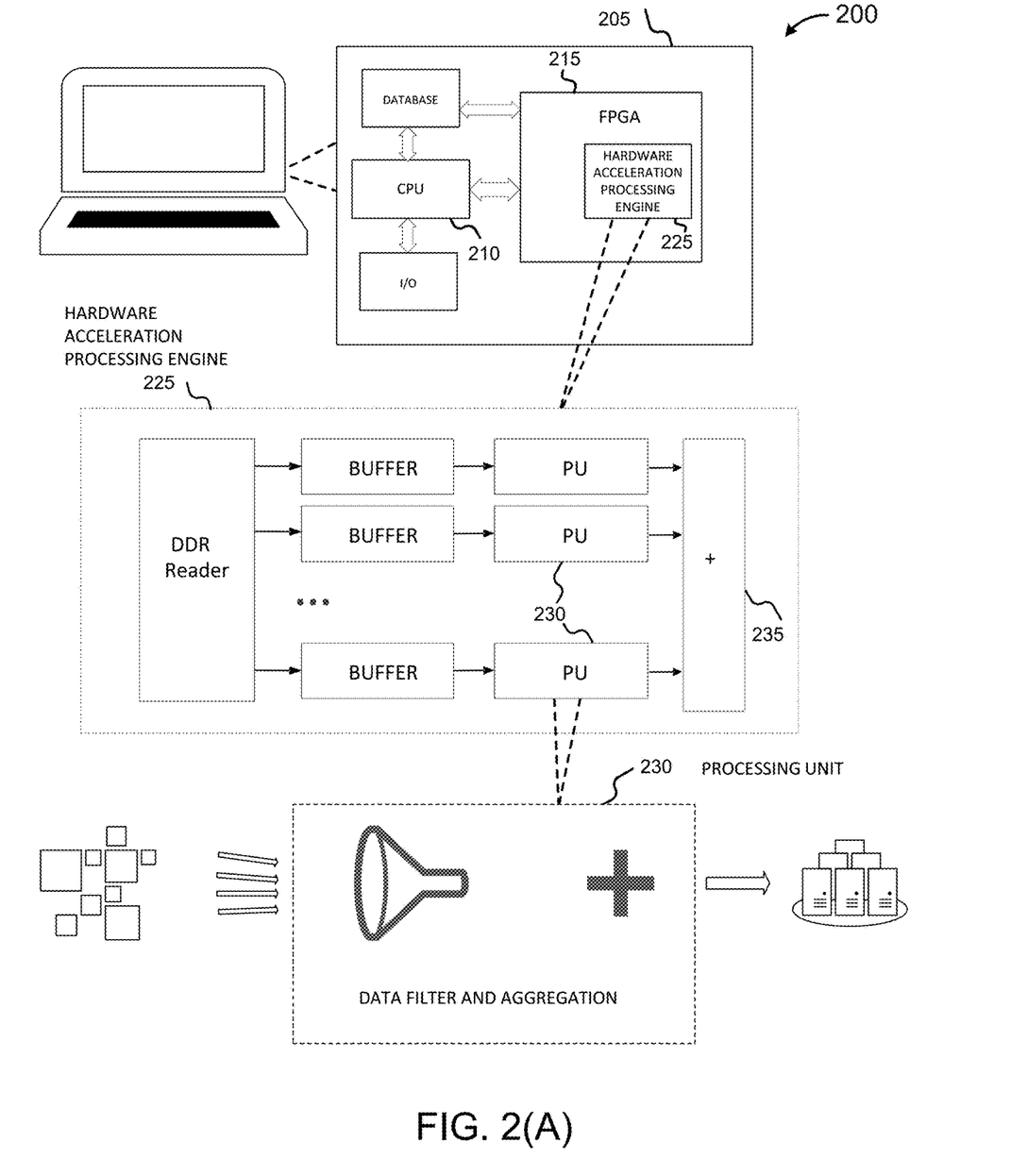
Figure 3:
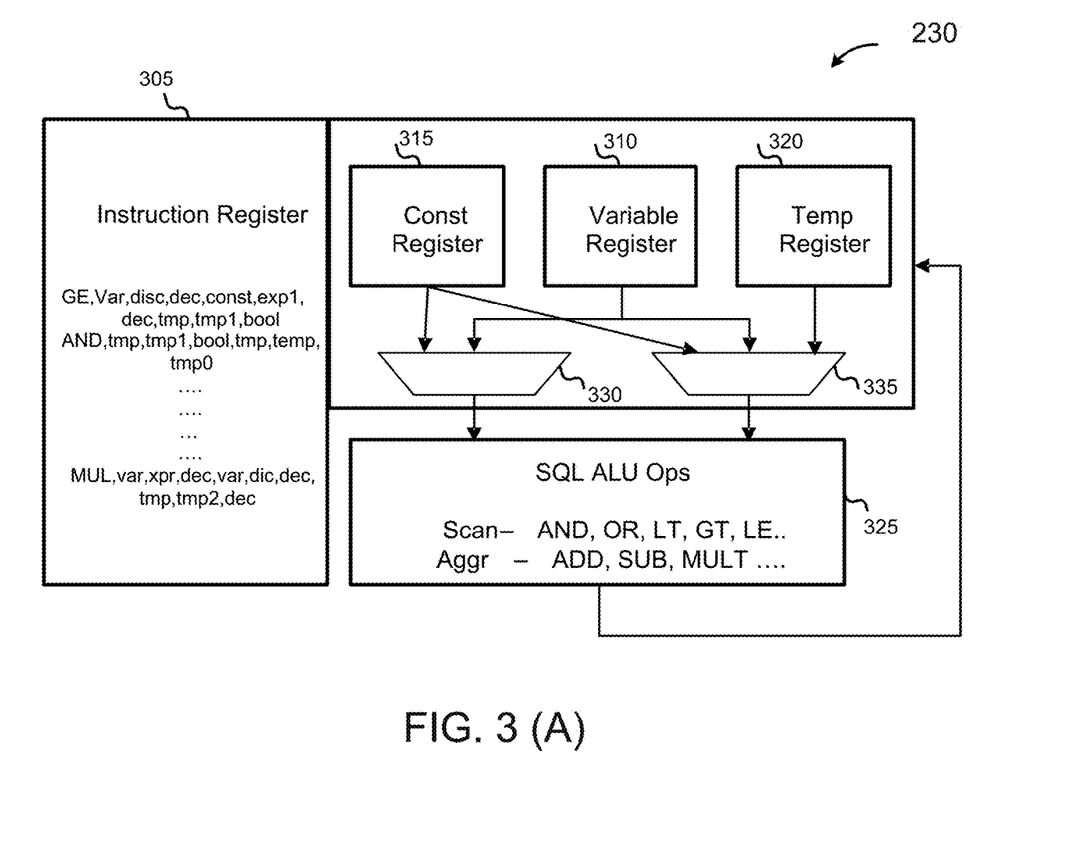
FIG. 3(A) depicts an exemplary processing unit comprised in the hardware acceleration processing engine of FIG. 2(B).
FIG. 3(B) illustrates some exemplary instructions to operate the exemplary processing unit of FIG. 2(B).

FIG. 2(A) depicts a host computing system with an exemplary hardware acceleration processing engine. A host computing system 200 includes a hardware accelerated processing system 205. The hardware accelerated processing system 205 includes multiple interconnected circuit subsystems, one of which is a central processing unit (CPU) 210 electrically coupled with a field programmable gate array (FPGA) 215. The FPGA may include a semiconductor integrated circuit substrate. The FPGA 215 may be used to share some of the central processing unit (CPU) work by a hardware acceleration processing engine flexibly reconfigurable to handle certain complex database query instructions. The FPGA 215 provides one or more hardware acceleration processing engines 225 to accelerate data query response speed. In various implementations, computational burden may be selectively off-loaded from the CPU 210 to the hardware acceleration processing engine 225 providing query-specific hardware circuity to efficiently produce a result in response to a large database query.

The hardware acceleration processing engine 225 includes a set of processing units (PU) 230 placed in parallel to execute data processing, and a concatenate unit 235 configured to concatenate processed results. Each of the processing units 230 may be independently programmed to execute predetermined filter and/or aggregate operations, for example, on a data stream. In various examples, the data stream input to each of the processing units PU 230 may include operations and/or record data. The operations may originate, for example, by a user entering a desired query via a user interface to the hardware accelerated processing system 205. The record data may be retrieved by the hardware accelerated processing system 205 from a database, which may be, for example, a remote third party or government data base in operable data communication (e.g., via a communication network) with the CPU 210. In some implementations, the CPU 210 may retrieve from the database a large volume of data records to process using the parameters of the user-input query. In some embodiments, those operations may include SQL instructions.

In some implementations, one or more processing engines 225 may be formed by employing a custom ASIC, alone or in combination with the FPGA 215. In such implementations, a custom ASIC with dedicated hardware circuits may be configured to perform one or more of the exemplary processing engine functions represented in the depicted figure. For example, an ASIC with custom fixed hardware circuits may be configured as hardware circuits designed to function as one or more of a DDR reader, buffer, processing units PU 230 and/or concatenate units 235 that are capable of efficiently executing at least a portion of a predetermined set of query operations. The ASIC may be arranged with hardware circuits configured to execute a predetermined set of query operations to be handled by the hardware accelerated processing system 205. In some examples, a custom fixed hardware configuration defined in the ASIC may be capable of executing query instructions that may offload, for example, computational burden off of the CPU 210 and/or off of one or more FPGAs, such as the FPGA 215, in the processing engine 225.

FIG. 2(B) depicts a block diagram of the hardware accelerated processing system of FIG. 2(A) performing an exemplary data query. In this illustrated example, the hardware accelerated processing system 205 includes the CPU 210, a FPGA 215, a database 220, and a query language processing unit 240 comprised in electrically reconfigurable hardware circuitry in the FPGA 215. In some embodiments, the query language processing unit 240 may be a SQL processing unit engine.

The CPU 210 receives a data query request from a user and may send a data query command signal to the query language processing unit 240 to program the FPGA 215 to execute a database query that may involve, for example, processing a data stream. In some embodiments, the data stream may include i different data blocks. In some embodiments, the FPGA 215 may include hardware resources, different kinds registers, multiplexers, concatenate units, and/or summers, for example.

The query language processing unit 240 provides a predetermined instruction set group G adapted to process data according to the data query command signal. The instruction set group G includes one or more instruction sets S(i). If the query language processing unit 240 accepts the data query command signal, then the FPGA 215 is reconfigured to provide processing units PU(i) to process the data stream in parallel according to the predetermined instruction set group G. PU(i) are the processing units 230 in FIG. 2(A). In some embodiments, each processing unit PU(i) may be configured with a corresponding set of the hardware resources to process a corresponding predetermined data block (i) of the data stream according to a predetermined instruction set S(i) in the instruction set group G.

In this illustrative example, the FPGA 215 receives a data stream from the database (e.g., via one or more data buffers). After retrieving the data stream from the database, data blocks (i) of the data stream may be allocated to i different processing units PU(i) by an input data scheduler. Those i different data blocks may be then processed by i parallel processing units PU(i), e.g., PU(1), PU(2), PU(3), PU(4), PU(i). Each PU(i) processes its data block(i) according to its own (e.g., independent) instruction set S(i). In some embodiments, all PU(i)s may be configured to have the same instruction set S(i). In some embodiments, some PU(i)s may have the same instruction set S(i). In some embodiments, each PU(i) may have a different instruction set S(i).

Each processing unit 230 may be independently programmed to execute a predetermined filter and aggregate operations, for example. In some embodiments, those operations may include a predefined set of query instructions, such as SQL instructions, for example. The hardware acceleration processing engine 225 may then transfer a final query result to the CPU 210.

In some embodiments, the hardware acceleration processing engine 225 and/or the query language processing unit 240 may be implemented, in part, by the CPU 210 executing a program of instructions that, when executed, cause operations to be performed to produce the hardware-accelerated query processing result, at least in part, through software-driven operations rather than entirely through the operation of hardware acceleration circuits. In some embodiments, the hardware acceleration processing engine 225 and/or the query language processing unit 240 may be embedded, in whole or in part, in the fixed circuitry of an ASIC. In some implementations, the PU(i) may be implemented by, for example, a series and/or parallel combination of fixed hardware circuits embedded in an ASIC and re-programmable hardware circuits embedded in an FPGA.

FIG. 3(A) depicts an exemplary processing unit comprised in the hardware acceleration processing engine of FIG. 2(B). In the illustrated FIG. 3(A), the processing unit 230, which may be an embodiment of the processing unit 230 of FIG. 2, includes an instruction register 305, a variable register 310 and an arithmetic logic unit (ALU) 325. The instruction register 305 is used to store arithmetic and/or logic instructions currently being executed or decoded. The variable register 310 accepts data that are allocated to the processing unit 230. The arithmetic logic unit (ALU) 325 is used to carry out arithmetic and logic operations on operands in computer instruction words. The type of instruction data can be any of the SQL types. For example, the instruction data may be decimals, integers, data, Boolean. In this depicted example, the instruction data includes integer and Boolean. The SQL types and instructions added to the processing unit 230 may make the processing unit 230 operative as a SQL processing unit, for example.

In some embodiments, a constant register 315 may be used to store constant data. In operation, constant data representing user-supplied query criteria may be input prior to processing a data stream at run time, for example, to assess the result of an instruction (e.g., variable data (greater than) constant data). In some embodiments, a temporary register 320 may be used to hold intermediate results. In some embodiments, multiplexers 330, 335 may be used to select data that need to be processed by the ALU 325. In some embodiments, the variable register 310 may be loaded with a data block (i) of a data stream. The ALU 325 may perform an operation on the loaded data block (i) by executing programmed instructions stored in the instruction register 305.

In some embodiments, the multiplexer 330 may be a 2:1 multiplexer and the multiplexer 335 may be a 3:1 multiplexer. In some embodiments, the multiplexer 330 may receive inputs from the constant register 315 and the variable register 310, and the multiplexer 335 may receive inputs from the constant register 315, the variable register 310 and the temporary register 320. In some embodiments, the instruction register 305 and the constant register 315 may be independently pre-programmed (e.g., at design time configuration of the individual hardware circuits as PU(i), which configuration is performed prior to run time execution of a query) to fulfill desired functions.

FIG. 3(B) illustrates some exemplary instructions to operate the exemplary processing unit of FIG. 2(B). The type of instruction data can be any of the SQL types. For example, the instruction data may be decimals, integers, data, Boolean. In this depicted example, the instruction data includes integer and Boolean. The SQL types and instructions added to the processing unit 230 may make the processing unit 230 operative as a SQL processing unit, for example. In some embodiments, the instructions in the set may be executed in-order to do SQL filter and aggregate operations. In some embodiments, the instructions may include filter operations, add or subtract operations and multiply operations. In some embodiments, the filter operations may include AND, OR, NOT, EQ, NEQ. In some embodiments, those instructions are pre-programmable and reconfigurable. In some embodiments, each of the processing units 230 may execute different pre-programmable instructions.

Figure 4:
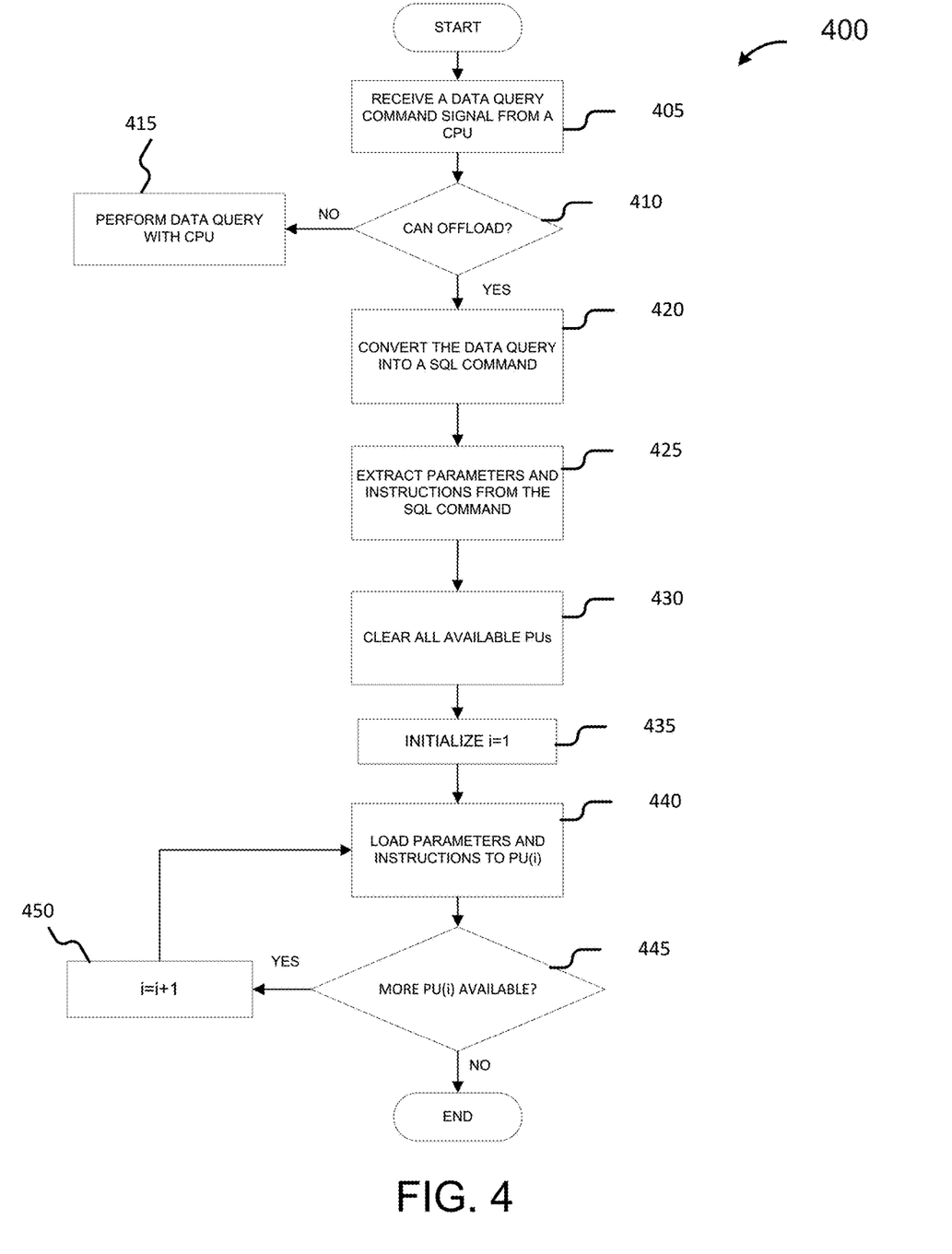
FIG. 4 depicts a flow chart of an exemplary design-time fabric reconfiguration method for a hardware acceleration processing engine configured to perform a data query job.

FIG. 4 depicts a flow chart of an exemplary design-time fabric reconfiguration method for a hardware acceleration processing engine configured to perform a data query job. In this illustrative example, a command signal is generated to execute hardware resources available in a block of programmable logic circuitry to form a hardware acceleration processing engine (e.g., the hardware acceleration processing engine 225 in FIG. 2(A)). In an exemplary method 400, a CPU (e.g., the CPU 210) receives, at 405, a data query command signal from a user via the CPU 210. With reference to FIG. 2A, when the CPU 210 receives the data query command signal, to increase the data query response speed, some part of the query job may be offloaded or allocated to the hardware acceleration processing engine 225. The CPU 210, at 410, determines whether the job to process a data stream may be offloaded or allocated to the FPGA 215. If the job is not suitable to be offloaded to the hardware acceleration processing engine 225, then control of the process may pass to the CPU 210 to execute instructions to perform, at 415, the data query without using the hardware acceleration processing engine 225.

If, at 410, the job is suitable to be offloaded to the hardware acceleration processing engine 225, then the CPU 210 converts, at 420, the data query command signal into a predetermined query language command, such as a SQL command, for example. Using the SQL command, the CPU 210 extracts parameters and instructions at 425. In the depicted example, at 430, the CPU 210 clears all available PUs by clearing any pre-existing configuration parameters or instructions previously programmed into the programmable logic of the FPGA 215.

To prepare to configure the FPGA 215 to off load the data query command signal from the user, the CPU 210 initiates a variable i=1 at 435. At 440, the CPU loads sets of the extracted parameters and instructions corresponding to a processing unit PU(i). If, at 445, more PU(i) are available to process any additional sets of the extracted parameters and instructions, then, at 450, the CPU increments the variable i and loops back to 440. If, at 445, more PU(i) are not available to process any additional sets of the extracted parameters and instructions, then the method 400 ends.

In an illustrative example, the FPGA 215 may be configured to choose whether to offload the job from the CPU or not. For example, a FPGA offload switch may be used to accept or reject the offload. Whether to accept or reject the job may depend on the type of the job. In this depicted example, the FPGA 215 may be configured to accept the job if the job is related to data scan and aggregation. If the FPGA rejects the offload, then the CPU 210 may process the query. In response to the data query command signal, a query language processing unit 240 may be configured to generate an instruction set group G. The instruction set group G may include one or more instruction sets S(i). Each of the parallel processing units (e.g., PU(i) of FIG. 2B) may be programmed to execute a predetermined instruction set S(i). More specifically, the query language processing unit 240 may be configured to transfer the query into a SQL command, extract parameters from the SQL command, and generate the instruction sets to be implemented by each corresponding processing unit in the FPGA 215. In some embodiments, each processing unit may have the same instruction set. In some embodiments, each processing unit may perform a different instruction set.

Next, the instruction set group G and extracted parameters may be loaded to the parallel processing units in the FPGA to process the data stream. For example, PU(1) may be loaded by a first instruction set S(1), PU(2) and PU(3) may be loaded by a second instruction set S(2). More specifically, for each PU(i), a constant register (e.g., the constant register 315 in FIG. 3(A)) may be loaded with one or more constant. An instruction register (e.g., the instruction register 305 in FIG. 3(A)) may be loaded with the predetermined instruction set S(i). Before loading new parameters to each of the processing units, each of the processing units may be cleared. For example, the constant register and the instruction register may be cleared. In some embodiments, a variable register (e.g., the variable register 310) and a temporary register (e.g., the temporary register 320) may also be cleared.

Then, the hardware acceleration processing engine may be ready to process the data stream.

An illustrative example is further described to explain the design-time process. For example, a user wants to know an online retailer's accumulated revenue happened in 1994, item discount was between 5% and 7%, and item quantity was less than 24. The user then sends a query to the CPU 210. The query is related to data scan and aggregation. Therefore, the FPGA 215 has the ability to process this query. The CPU 210 then offloads the query job to the FPGA. The query language processing unit 240 may accept the query and transfer the query into a SQL command.

An exemplary query may be:

```
SELECT SUM(L__EXTENDEDPRICE*L__DISCOUNT) AS REVENUE
FROM LINEITEM
WHERE L__SHIPDATE >= '1994-01-01' AND L__SHIPDATE <
'1995-01-01' AND L__DISCOUNT BETWEEN .06 − 0.01 AND .06 +
0.01 AND L__QUANTITY < 24
```

The query may be then transformed into SQL commands using software. Software may extract parameters and instructions from the SQL command. An exemplary SQL command before the processing unit may look like:

```
Define constants like -
def l__quantity 0
def l__extendedprice 1
def l__discount 2
def l__shipdate 3
def d1994__01__01 1994/01/01
def c1 1
def d1995__01__01 1995/01/01
def c5 500
LD CONST[0] d1994__01__01
GE VAR[l__shipdate] CONST[0] TEMP[C0]
# save the result of "l__shipdate < date '1994-01-01' + interval '1' year"
to TEMP1
LT VAR[l__shipdate] CONST[1] TEMP[1]
# save the result of "l__shipdate >= date '1994-01-01'
# and l__shipdate < date '1994-01-1' + interval '1' year" to TEMP0
AND, TEMP, TEMP0, BOOL, TEMP, TEMP1, BOOL, TEMP, TEMP0,
BOOL</V>
# Decompose "l__discount between .06 − 0.01 and .06 + 0.01" as
# a. "l__discount >= .05" and
# b. "l__discount <= .07"
# save the result of "l__discount <.05" to TEMP1
<V>GE, VAR, l__discount, DECIMAL, CONST, exp3__1__con,
DECIMAL, TEMP, TEMP1, BOOL</V>
<V>AND, TEMP, TEMP0, BOOL, TEMP, TEMP1, BOOL, TEMP,
TEMP0, BOOL</V>
<V>LE, VAR, l__discount, DECIMAL, CONST, exp3__2__con,
DECIMAL, TEMP, TEMP1, BOOL</V>
<V>AND, TEMP, TEMP0, BOOL, TEMP, TEMP1, BOOL, TEMP,
TEMP0, BOOL</V>
# save the result of "l__quantity < 24" to TEMP1
<V>LT, VAR, l__quantity, DECIMAL, CONST, exp4__con,
DECIMAL, TEMP, TEMP1, BOOL</V>
# save the result of the whole qualifier to TEMP0
<V>AND, TEMP, TEMP0, BOOL, TEMP, TEMP1, BOOL, TEMP,
TEMP0, BOOL</V/>
</E>
```

As shown is FIG. 4, the extracted parameters and instruction sets S may be then respectively loaded to available processing units in the FPGA 215 to perform the query operation. When data gets streamed at run time, those programmed processing units may start to perform the query operation, an example of which is described in further detail with reference to FIG. 6.

Figure 5:
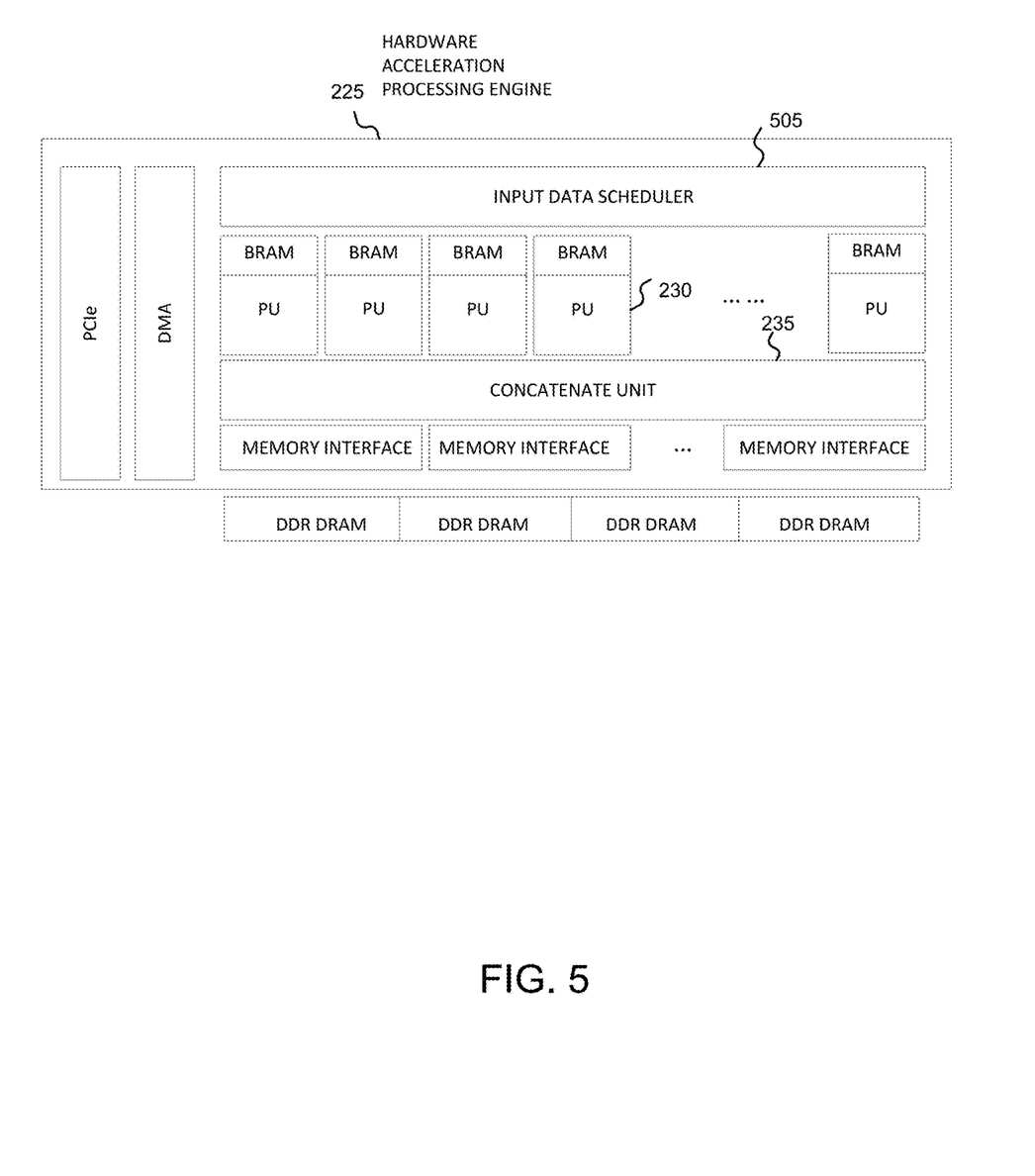
FIG. 5 depicts an exemplary structure of the hardware acceleration processing engine.

FIG. 5 depicts an exemplary structure of the hardware acceleration processing engine. With reference to FIG. 2(A-B), FIG. 5 depicts an embodiment of the hardware acceleration processing engine 225 includes an input data scheduler 505 to coordinate inputs to the PU(i) 230, and the concatenate unit 235 to process the outputs of the PU(i) 230.

The input data scheduler 505 may be configured to divide an incoming data stream into several predetermined data blocks. These data blocks can then be allocated to appropriately configured PU(i) 230 to perform a predetermined instruction set S(i) appropriate for that data block. In some embodiments, at least two or more of the PU(i) operate in parallel on data blocks. In the depicted example, data streams may be, for example, delivered to the hardware acceleration processing engine 225 via a high-speed data communication channel (e.g., PCIe, DMA) in operative communication with a data stream source (e.g., database). Each of the blocks of streaming data processed by the input data scheduler 505 may be buffered through a block of BRAM before delivery to the PU(i) 230.

The concatenate unit 235 may be configured to merge results processed by each of the PU(i) 230. In some embodiments, the concatenate unit 235 may be a hardware unit. In some embodiments, each processing unit 230 may be configured to perform predetermined data filter and aggregation instructions.

The hardware acceleration processing engine 225 also includes a scheduler 505 to schedule jobs in this hardware acceleration processing engine. The scheduler 505 allocates data blocks in the data stream into corresponding processing units. In some embodiments, the scheduler 505 may be a round-robin scheduler. In some embodiments, each processing unit 230 may be fed into its own HTTP Live Streaming (HLS) stream with different read and write data width. In some embodiments, a striped read buffer may be used to minimize usage of block RAMs for read and write buffers. In some embodiments, wide DDR (double data-rate) width may be used to maximize efficiency with optical PU resource used and the number of processing cycles. In some embodiments, DDR burst length may be long enough to reduce DDR inefficiency.

Figure 6:
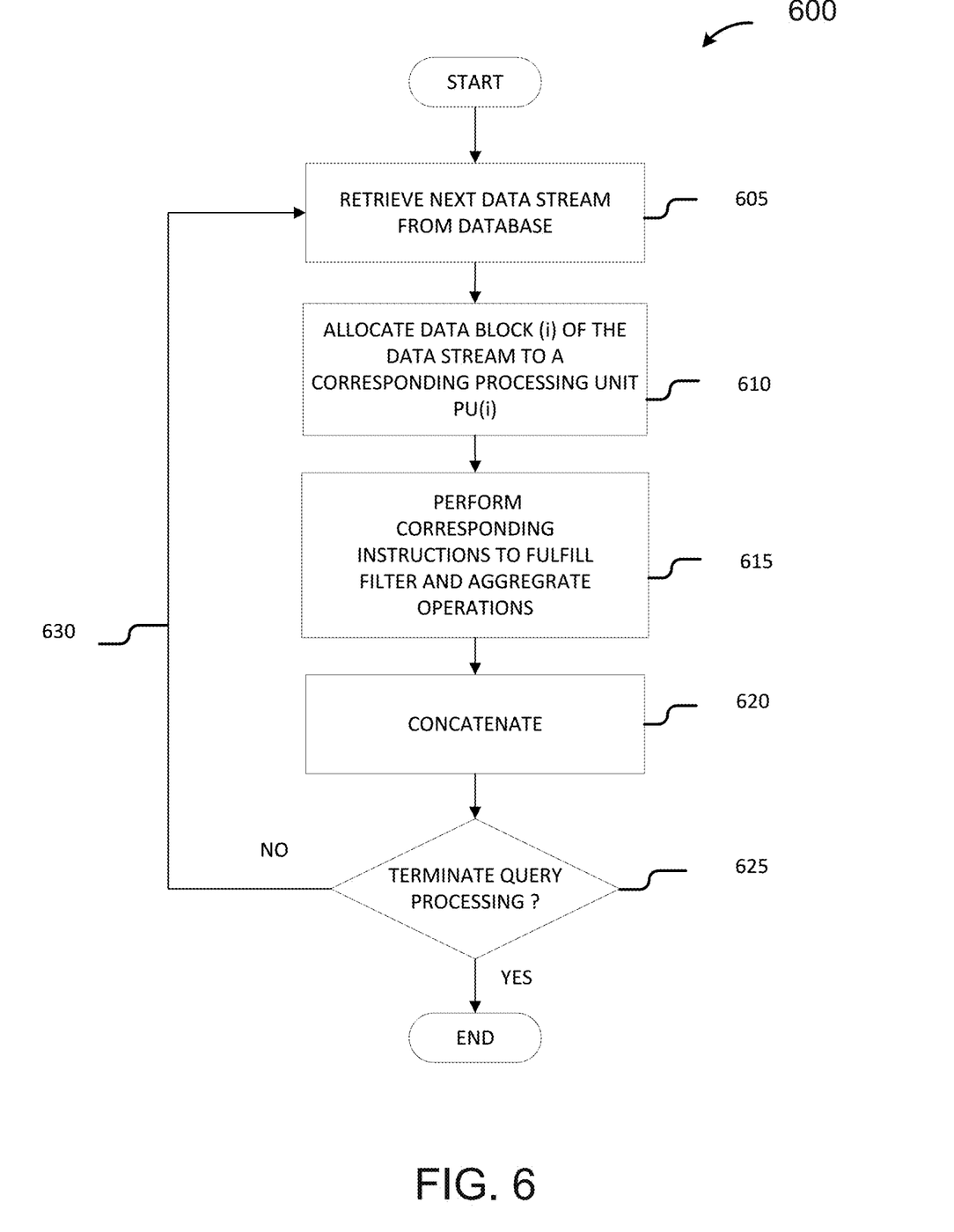
FIG. 6 depicts a flowchart of an exemplary run-time method for performing a data query with a programmable hardware acceleration processing engine.

FIG. 6 depicts a flowchart of an exemplary run-time method for performing a data query with a programmable hardware acceleration processing engine. In the method 600, a programmable hardware acceleration processing engine (e.g., the hardware acceleration processing engine 225 in FIG. 5) retrieves a data stream from a database at 605. At 610, a scheduler (e.g., the scheduler 505 in FIG. 5) schedules and divides the data stream into different data blocks to be processed by different, independent, and programmable processing units (e.g., processing units 230 in FIG. 5) in the programmable hardware acceleration processing engine in response to the programmed instructions. Then, at 615, each independent and programmable processing unit in the processing engine performs predetermined data filter and aggregate operations to generate a processed result. In some embodiments, an SQL query may be used to fulfill the data filter and aggregate operations. At 620, those processed results are concatenated by a concatenate unit (e.g., the concatenate unit 235 in FIG. 5) to form an output result. At 625, whether to terminate the data query process is determined. If the data stream has more records to process, then the method 600 returns to 605. If the data stream has no more records to process, then the method has determined the result for the query and is completed. In some embodiments, this query result output may be then, for example, displayed on a user interface.

In an illustrative example, a query algorithm could be:

```
LOAD INSTRUCTION REGISTERS
DO FOR EACH DATA BLOCK {
    LOAD VARIABLE REGISTERS
    EXECUTE INSTRUCTIONS
    MOVE RESULT BACK TO HOST CPU
}
```

An illustrative example is further described to explain the design-time process. For example, the FPGA 215 may include five processing units that are available to perform the query operation. The extracted parameters and instructions may be already loaded to the FPGA 215 to perform the query operation. The FPGA may then retrieve a data stream from a database that relates to the online retailer's sales records. The sales records may include 200-page data. The FPGA may retrieve 20-pages of records data from the database. The scheduler 505 may allocate the retrieved data in page 1 to a first processing unit and allocate data in page 2 to a second processing unit, etc. An example of the allocated results is shown in the following table.

| Allocate data to correct PUs | | | | |
|---|---|---|---|---|
| PU1 | Data in Page 1 | Data in Page 6 | Data in Page 11 | Data in Page 16 |
| PU2 | Data in Page 2 | Data in Page 7 | Data in Page 12 | Data in Page 17 |
| PU3 | Data in Page 3 | Data in Page 8 | Data in Page 13 | Data in Page 18 |
| PU4 | Data in Page 4 | Data in Page 9 | Data in Page 14 | Data in Page 19 |
| PU5 | Data in Page 5 | Data in Page 10 | Data in Page 15 | Data in Page 20 |

Each of the processing units may then perform its instructions as data are loaded to the variable registers. Temporary results may be stored in the temporary registers 320. After all pages 1, 6, 11, 16 are queried by the processing unit PU1, the PU1 may output a first accumulated revenue sum1 for page 1, 6, 11, 16 under the instructions. PU2 will output a second accumulated revenue sum2, etc. The output concatenate unit 235 will perform a final calculation and return a final result to the user.

Although various embodiments have been described with reference to the figures, other embodiments are possible. For example, in some embodiments, an SQL query may be translated into instructions and loaded to execute on FPGA. In some embodiments, a different SQL query may be executed without recompiling on FPGA. In some embodiments, these executed SQL queries may be suitable for OLAP (Online Analytics Processing). In some embodiments, PostgreSQL and its various extensions may be used for data analytics and GIS applications.

In some embodiments, users can execute their existing Postgres SQL queries on an accelerated FPGA platform. In some embodiments, the hardware acceleration processing engine may be a massively parallel SQL processing unit, and an instruction code for a massively parallel SQL processing unit may be generated on-the-fly for each consecutive user query. In some embodiments, Postgres storage pages may be natively parsed in FPGA to scan through the rows of relationships to select the rows specified by a where clause, and users may use all existing Postgres features to execute remote or local queries.

In some embodiments, users may use 32 SQL PU on VU9P device for an F1 implementation, for example. In some embodiments, each of the PU can be extended to hash, sort, or customer-specific instructions. In some embodiments, data under processing may be block-streamed from the FPGA using multiple buffers to hold input and output data to ensure that the FPGA acceleration kernel is not starved.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, for example, in a machine-readable storage device, for execution by a programmable processor; and methods can be performed by a programmable processor executing a program of instructions to perform functions of various embodiments by operating on input data and generating an output.

Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices. The processor and the memory can be supplemented by, or incorporated in, ASICs (application-specific integrated circuits). In some embodiments, the processor and the memory can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In various embodiments, a computer system may include non-transitory memory. The memory may be connected to the one or more processors, which may be configured for storing data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits and/or other modules. In various examples, the modules may include analog and/or digital logic, discrete components, traces and/or memory circuits fabricated on a silicon substrate including various integrated circuits. In some embodiments, the module(s) may involve execution of preprogrammed instructions and/or software executed by a processor. For example, various modules may involve both hardware and software.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. An integrated circuit comprising:
a plurality of processing units (PU(i)), arranged in parallel, each of the plurality of PU(i) being formed of hardware circuits configured to process selected data blocks of a data stream according to a predetermined instruction set (S(i)) in an instruction set group (G) that uses a predetermined query language, each of the plurality of PU(i) generating an intermediate output result corresponding to the selected portion of the data stream processed by the PU(i); and,
a concatenate circuit coupled to receive each of the intermediate output results from each of the plurality of PU(i) and to generate an aggregated result,
wherein each of the S(i) comprises a function of an instruction extracted from a user defined query.

2. The integrated circuit of claim 1, wherein the predetermined instruction set (S(i)) comprises SQL instructions.

3. The integrated circuit of claim 1, wherein the predetermined query language comprises SQL.

4. The integrated circuit of claim 1, wherein the concatenate circuit is configured to generate the aggregated result according to a predetermined function associated with the user defined query.

5. The integrated circuit of claim 1, wherein each of the plurality of PU(i) s implemented as a fixed hardware circuit in an ASIC.

6. The integrated circuit of claim 1, wherein each of the plurality of PU(i) is implemented as reconfigurable hardware in a programmable fabric of an FPGA.

7. The integrated circuit of claim 1, further comprising a scheduler circuit coupled to receive the data stream, wherein the scheduler circuit is configured to selectively direct each one of the data blocks to one of the plurality of the PU(i).

8. The integrated circuit of claim 7, wherein the scheduler circuit comprises a round-robin scheduler.

9. The integrated circuit of claim 1, wherein each of the S(i) further comprises a function of at least one parameter extracted from the user defined query.

10. The integrated circuit of claim 9, wherein each of the plurality of PU(i) comprises an arithmetic logic unit ALU adapted to execute the corresponding S(i) by performing an operation based on an extracted instruction, wherein the operation is performed using (i) a first operand comprising a portion of the data stream stored in a variable register, and (ii) a second operand comprising one of the extracted parameters stored in a constant register.

11. The integrated circuit of claim 10, wherein each of the plurality of PU(i) further comprises:
a temporary register configured to hold a result of the performed operations;
a first multiplexer configured to receive inputs from the constant register and the variable register; and, a second multiplexer configured to receive inputs from the constant register, the variable register, and the temporary register.

12. The integrated circuit of claim 11, each of the plurality of PU(i) further comprising: an instruction register configured to store the S(i) to be performed in the ALU.

13. The integrated circuit of claim 1, wherein each of the plurality of PU(i) is configured with the same S(i).

14. The integrated circuit of claim 1, wherein each of the plurality of PU(i) is configured with a different S(i).

15. The integrated circuit of claim 1, wherein the predetermined instruction set (S(i)) comprises scan instructions and aggregation instructions.

16. The integrated circuit of claim 15, wherein the scan instructions comprise an AND logic operation and an OR logic operation.

17. A method to configure a fabric to perform a data query, comprising:
   receiving the data query from a user;
   converting the data query into a predetermined query language command;
   extracting parameters to be stored in a plurality of parallel processing units (PU(i)) from the command, and
   extracting instructions from the command to form an instruction set group G to be performed by the plurality of PU(i), the instruction set group G comprising a plurality of instruction sets S(i); and,
   loading the plurality of PU(i) with the extracted parameters and the extracted instructions,
   wherein, each of the plurality of PU(i) is configured to process, in parallel, a predetermined data block(i) of a data stream with its corresponding parameters and instruction set S(i).

18. The method of claim 17, wherein the predetermined query language comprises SQL.

19. The method of claim 17, wherein each of the plurality of PU(i) is configured with the same S(i).

20. The method of claim 17, further comprising clearing all of the plurality of PU(i) before loading the extracted parameters and the extracted instructions.

* * * * *